US006264125B1

(12) United States Patent
Cockerham et al.

(10) Patent No.: US 6,264,125 B1
(45) Date of Patent: Jul. 24, 2001

(54) ASYMMETRIC OSCILLATION MECHANISM FOR A SPINNING REEL

(75) Inventors: Rayford A. Cockerham, Broken Arrow; David A. Kern, Tulsa, both of OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/457,983

(22) Filed: Dec. 9, 1999

(51) Int. Cl.[7] .................................................. A01K 89/01
(52) U.S. Cl. .............................................................. 242/242
(58) Field of Search ....................................... 24/241, 242

(56) References Cited

U.S. PATENT DOCUMENTS

| | | |
|---|---|---|
| 562,086 | 6/1896 | Livingstone . |
| 1,563,305 | 11/1925 | Ambler . |
| 2,680,575 | 6/1954 | Hayes . |
| 2,687,855 | 8/1954 | Shakespeare et al. . |
| 2,713,463 | 7/1955 | Sarah . |
| 2,724,563 | 11/1955 | Shakespeare et al. . |
| 2,773,665 | 12/1956 | Berger et al. . |
| 2,879,954 | 3/1959 | Small . |
| 3,033,486 | 5/1962 | Wood, Jr. . |
| 3,119,573 | 1/1964 | Brulhart . |
| 3,367,597 | 2/1968 | Morritt . |
| 3,948,465 | 4/1976 | Scusa . |
| 4,026,493 | 5/1977 | Anderson . |
| 4,114,825 | 9/1978 | Murvall . |
| 4,191,343 | 3/1980 | Morishita . |
| 4,196,968 | 4/1980 | Shepherd . |
| 5,012,990 | * 5/1991 | Kawabe ................................ 242/242 |
| 5,143,318 | 9/1992 | Tipton et al. . |
| 5,350,131 | 9/1994 | Baumgartner et al. . |
| 5,871,164 | * 2/1999 | Shibata ................................. 242/241 |
| 5,921,489 | 7/1999 | Shibata . |
| 6,000,653 | * 12/1999 | Okada .................................. 242/242 |
| 6,082,650 | * 7/2000 | Okada et al. ........................ 242/242 |

FOREIGN PATENT DOCUMENTS

| | | |
|---|---|---|
| 917518 | 7/1949 | (DE) . |
| 948 760 | 9/1956 | (DE) . |
| 700 7657 | 3/1970 | (DE) . |
| 7006746 | 7/1970 | (DE) . |
| 2 264 480 | * 10/1975 | (FR) ..................................... 242/242 |
| 694177 | 9/1965 | (IT) . |

OTHER PUBLICATIONS

Mamiya Catalog, 1999, p. 20.
Photograph of SL2 Reel with Guide Slot Shape and Snapshot SL2 Spinning Owner's Manual, Brunswick Corporation, 1990.

* cited by examiner

*Primary Examiner*—Katherine A. Matecki
(74) *Attorney, Agent, or Firm*—Fellers, Snider, Blankenship, Bailey & Tippens, P.C.

(57) ABSTRACT

There is hereinafter provided a reciprocating/oscillating structure for use in a fishing reel, wherein the guide carries a guide slot within it that is asymmetric in shape, and that creates two separate spool movement velocity regimes as the spool is moved forward and backward during recall of fishing line into the reel. The guide slot of the instant invention is asymmetrically constructed to produce, in a two-cycle-type spool movement arrangement, one spool velocity profile in the forward direction and a different spool velocity function in the rearward direction. In the preferred embodiment, the two velocity profiles (asymmetries of the guide) will be chosen to be complementary in the sense that imperfections in the velocity function in one direction can be compensated for to some extent during movement in the second cycle.

10 Claims, 5 Drawing Sheets

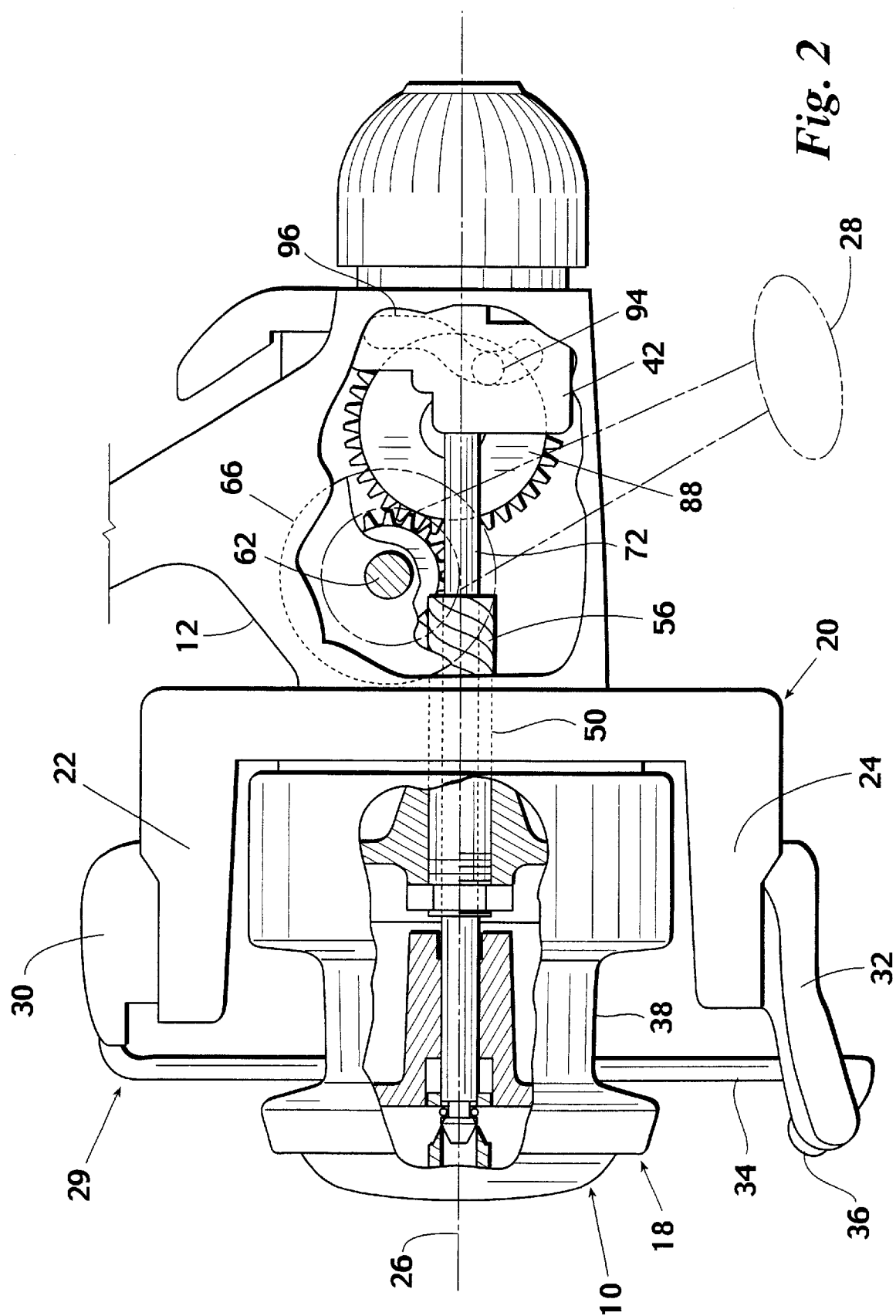

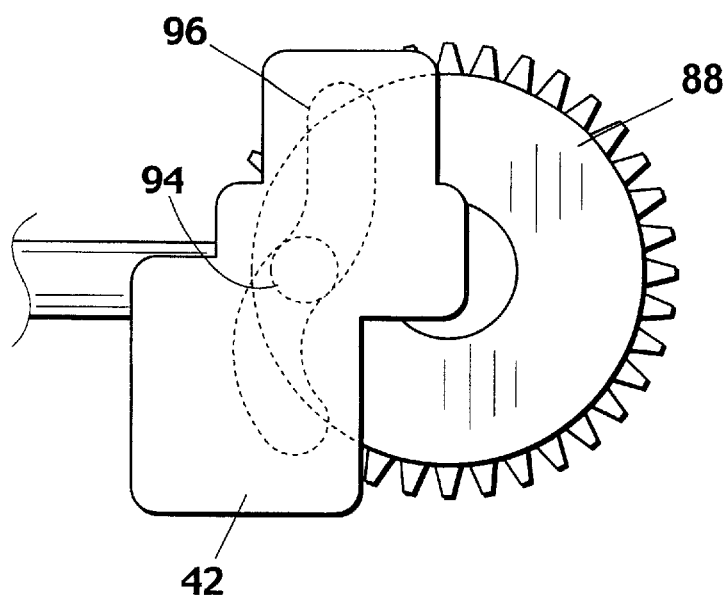 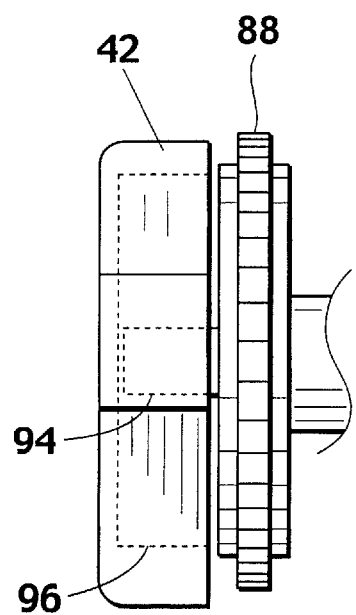
*Fig. 3*  *Fig. 4*
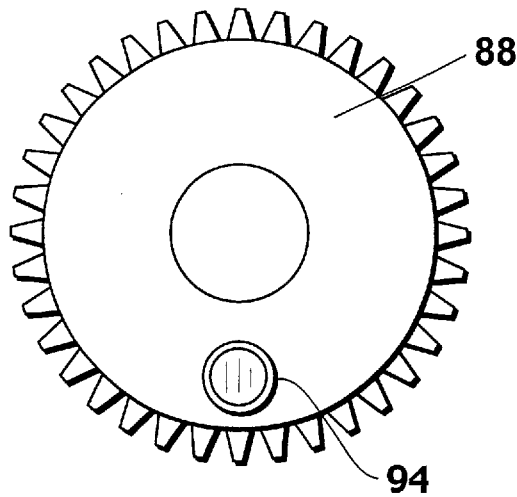 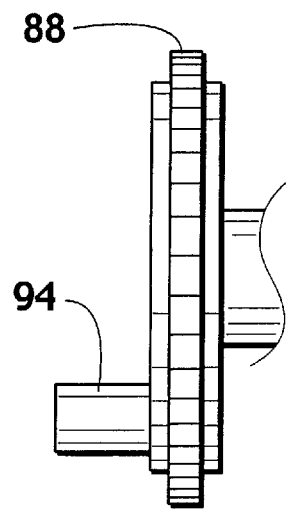
*Fig. 11*  *Fig. 12*

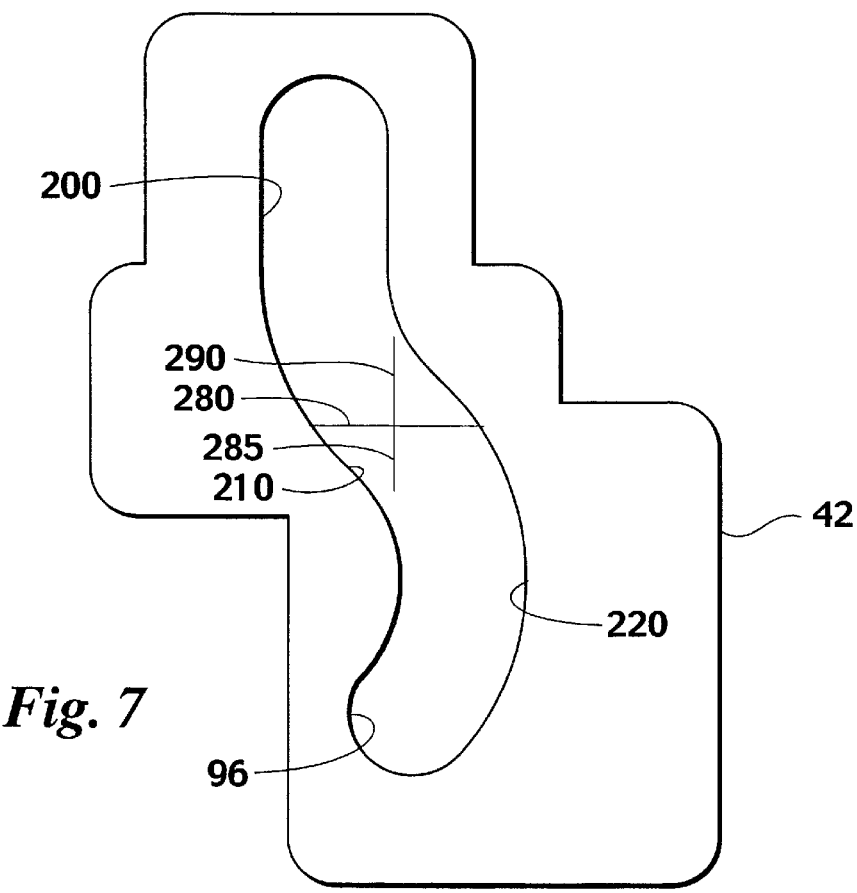
Fig. 7
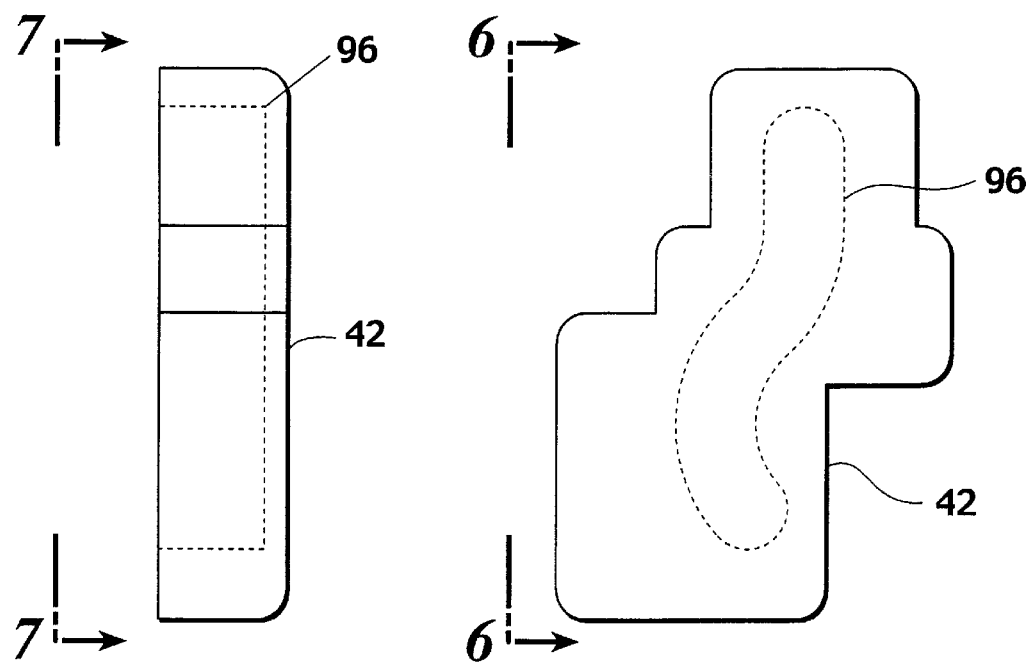
Fig. 6
Fig. 5

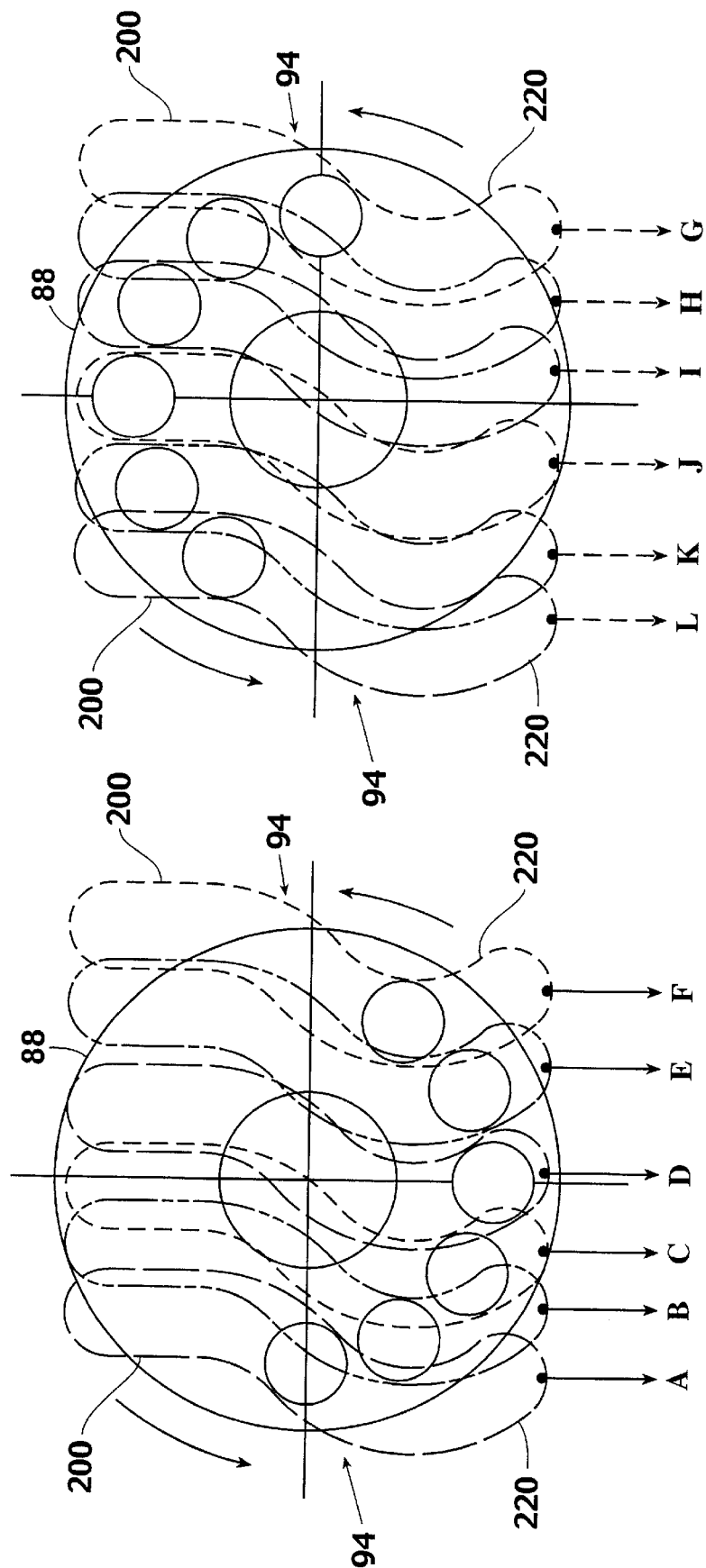
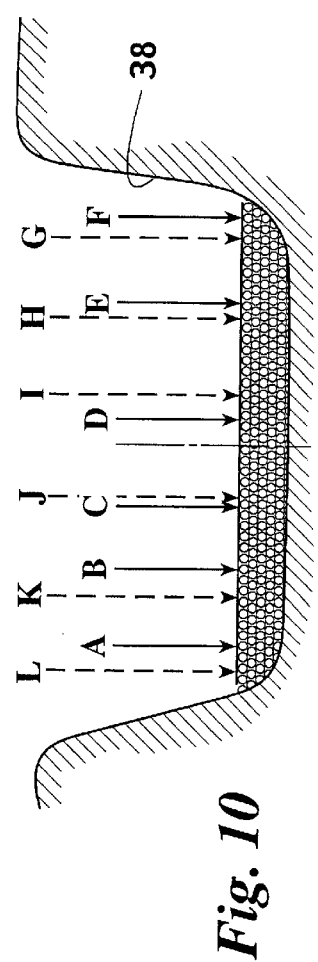
Fig. 8
Fig. 9
Fig. 10

ASYMMETRIC OSCILLATION MECHANISM FOR A SPINNING REEL

FIELD OF THE INVENTION

This invention relates generally to fishing reels and, more particularly, to an improved oscillation mechanism for use when fishing line is drawn into a reel.

BACKGROUND OF THE INVENTION

From a user perspective, fishing reels are devices for distributing fishing line during a cast and winding it up again when the bait is retrieved. During normal operations, a fisherman ties some sort of object (e.g., a fishing lure) to one end of a long continuous piece of fishing line, the other end of which is secured to the reel's spindle or spool. The excess fishing line is wrapped about this same spool. Then, the selected object and the line attached thereto are cast into the water, with line from within the reel being smoothly released from the reel so as to impede as little as possible the flight of the cast object. The line is then recalled back to the reel through the use of a handle or crank, thereby winding it once again about the spool. Of course, in the preferred scenario a fish will be attached to the remote end of the line when it is so-recalled.

It is the recall of line to the reel and the associated rewinding of it onto the spool which is the subject matter of the instant disclosure. More particularly, when line is retrieved, care must be taken to distribute it on the spool in such as manner as to insure that it can be extracted smoothly again at the next cast, thereby insuring that the next cast is as long as is possible under the circumstances.

In a typical spinning fishing reel arrangement, when the crank is turned to recall the fishing line back to the reel, oscillatory longitudinal movement is imparted to the spool in a direction substantially traverse to the direction from which line enters the spool (i.e., parallel to the longitudinal axis of the spool, the "longitudinal" direction, hereinafter) so as to distribute the line more uniformly along the length of the spool. The spool's oscillatory motion is typically created as follows. Rotation of the crank turns a drive gear that contains a protrusion or pin on its face. The pin engages a guide slot that is cut into a slider-type guide, which guide is mounted on a movable central shaft that is constrained so as to be movable only in the longitudinal direction. As the gear rotates, the pin does likewise, thereby imparting reciprocating movement to the guide as the pin traces a path through its slot. Movement of the guide is then translated to the shaft which, in turn, moves the spool.

In other instances, the guide might take the form of a lever arm which is pivotably attached to the reel housing at one end, with the other end of the lever being free to move along with the pin. As the pin travels through the guide slot, it moves the lever arm which, in turn, imparts longitudinal motion to the spool. An example of this sort of guide may be found in Tipton et al., U.S. Pat. No. 5,143,318, the disclosure of which is incorporated herein by reference.

It is well known that the shape of the guide slot substantially influences the resulting movement of the spool and, hence, the distribution pattern of line that is deposited thereon. Many sorts of guide shapes have been suggested, each of which has its own advantages and disadvantages. Early efforts focused on the use of a straight guide slot, but it has been determined that this shape tends to pile up line near the outer margins of the spool. Better results have been obtained using "shaped" guide slots, with the shape being selected to make the line distribution as uniform as possible across the width of the spool. Two examples of the sorts of patterns that others have tried with varying degrees of success include the "Z" pattern of Shibata (U.S. Pat. No. 5,921,489) and the "S" pattern of Baumgartner et al. (U.S. Pat. No. 5,350,131), the disclosures of which are incorporated herein by reference.

However, a problem with conventional spinning style reels is that they are susceptible to having the line bury itself as it is retrieved, which can cause binding the next time the line is paid out, as during a cast. One explanation for this phenomena is that the same velocity function—as defined by the shape of the guide curve—controls the distribution of the line as it moves out and back again. In other words, the coils of line tend to wrap closely next to each other as the spool moves slowly in each direction. The result of this is that the overlying turns align with and tend to be guided into the gap between adjacent underlying turns, thus, causing the line to "bury" itself. Further, since the actual velocity imparted to the spool can never really be constant—which would be the ideal situation—imperfections in the velocity function will be reflected in imperfections in the distribution of line along the width of the spool. Still further, problems in the out-going spool velocity profile will be mirrored by the in-coming spool velocity.

One solution to this problem, as suggested in Tipton et al., cited previously, is to place the guide slot within a lever arm that is mounted in such as way as to cause an asymmetric velocity profile, such that the time for the spool to pass through the out-going cycle is longer (or shorter) than the time required for the spool to pass through the in-coming portion of the cycle. This has the effect of causing the line turns laid in one part of the stroke cycle to be more closely spaced than those in the other part of the stroke cycle. However, this approach is limited to use on a lever-arm based mechanism: it does not generally address the underlying problem of uneven line distribution on any type of reel.

Heretofore, as is well known in the fishing reel arts, there has been a need for an invention to address and solve the above-described problems. Accordingly, it should now be recognized, as was recognized by the present inventor, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is hereinafter provided a reciprocating/oscillating structure (or "guide") for use in a fishing reel, wherein the guide carries a guide slot within that is asymmetric in shape, and that creates two separate spool movement velocity regimes as the spool is moved forward and backward during recall of fishing line into the reel. The guide slot of the instant invention is asymmetrically constructed to produce, in a two-cycle-type spool movement arrangement, one spool velocity profile in the forward (first cycle) direction and a different spool velocity function in the rearward (second cycle) direction, where forward and rearward are measured with respect to the rod tip and reel handle, respectively. In the preferred embodiment, the two velocity profiles (asymmetries of the guide) will be chosen to be complementary in the sense that imperfections in the spool movement in one direction can be at least partially compensated for during movement in the other direction.

According to a first preferred embodiment of the instant invention, there is provided a slider-type guide with an asymmetric guide slot placed therein, which imposes different velocity functions on the movement of the spool during each portion of the oscillation cycle. In more particular, during the first (rearward) portion of the movement cycle, the pin is within a section of the guide slot that is substantially straight and oriented to be roughly transverse to the spool movement direction. During the second (forward) portion of its stroke cycle, the pin will travel through a curved section that is "C" shaped, with the concave portion of the "C" oriented to face the rear of the reel. These two portions of the guide slot are preferably smoothly connected by a linear ramp.

According to another preferred embodiment, there is provided an asymmetric guide slot substantially as described above, but wherein the guide takes the form of a lever arm which is rotably affixed at one end to a stationary member within the reel and which is engaged at its other end with the central shaft. Thus, movement of the pin through the asymmetric slot results in a pivoting movement of the lever arm about its fixed end which, in turn, is communicated to the spool.

Of course, there are many other variations of this concept that might be applied in practice. However, the broad approach suggested by the instant inventor is that the two halves of the guide slot should be chosen to be different from one another and, to the extent possible, complementary—velocity wise—to insure as the rewound fishing line be distributed as evenly as possible on the spool. That is, the spool motion in one direction is specifically selected so as to compensate for deficiencies (e.g., non-uniformities) of the spool motion in the other direction.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which:

FIG. 2 is a cut-away view of a typical spinning reel in which the spool is at its most rearward position.

FIG. 3 is a plan view that illustrates in more detail how the pin on the drive gear is situated within the guide slot.

FIG. 4 is a side view of the guide-drive gear assembly.

FIG. 5 is a plan view of a preferred embodiment of the instant guide and guide slot.

FIG. 6 contains a side view of a preferred embodiment of the instant guide and slot.

FIG. 7 is a more detailed plan view of the instant guide/guide slot combination.

FIG. 8 illustrates the how the position of the guide changes during one part of the stroke cycle.

FIG. 9 illustrates how the position of the guide changes as the pin traces the other half of the guide slot.

FIG. 10 contains a schematic illustration of how fishing line is laid onto the spool during the different portions of the cycle illustrated in FIG. 8 and 9.

DETAILED DESCRIPTION OF THE INVENTION

General Background

Figure 1:
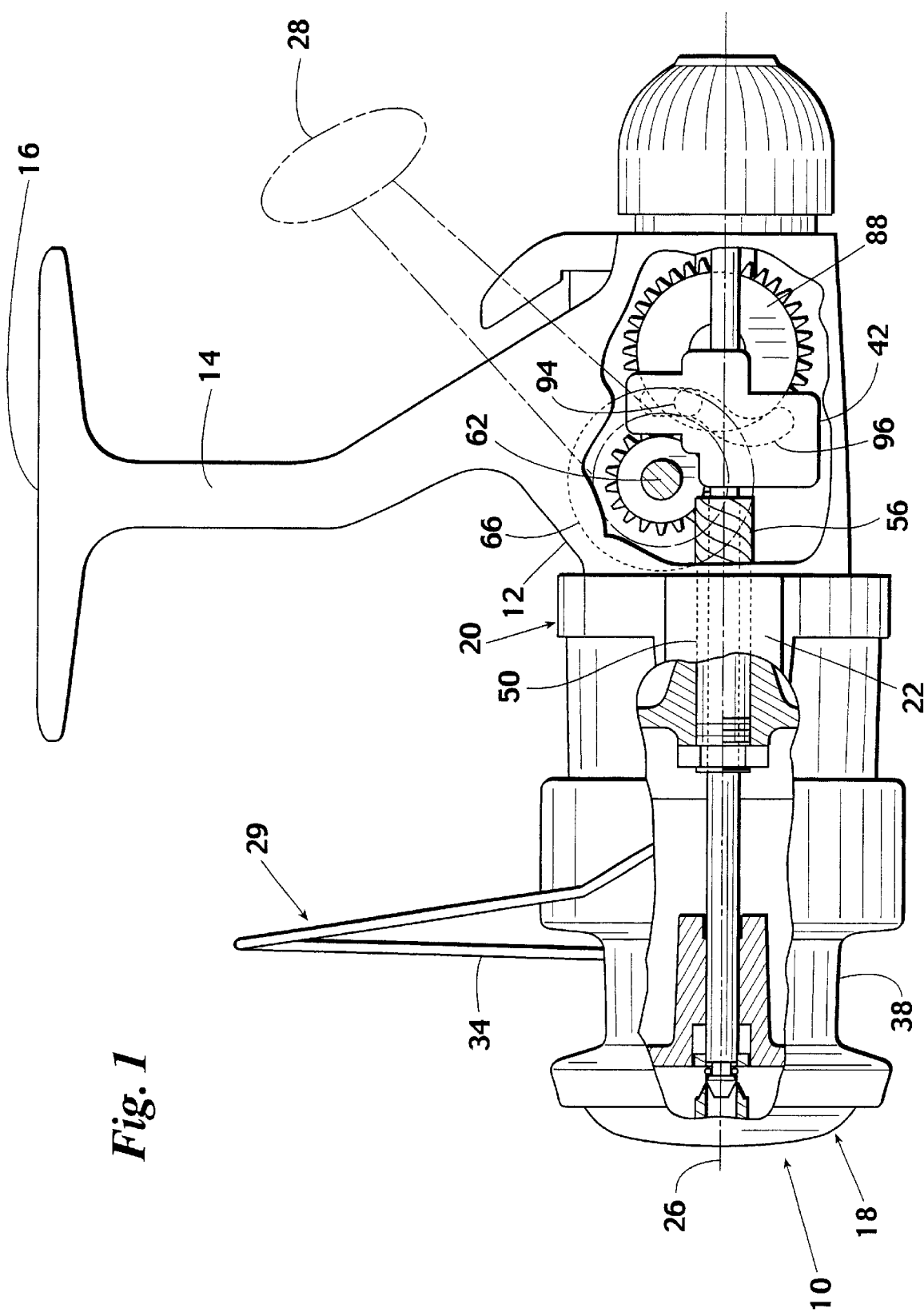
FIG. 1 is a cut-away view of a typical spinning reel, which illustrates the general environment of the instant invention. In this figure, the spool is near its point of maximum forward travel.

In FIGS. 1 and 2, a spinning style fishing reel 10 is shown, which reel 10 is of the type suitable for incorporation of the present invention. The reel 10 consists of a fixed housing 12 with an integral mounting stem 14 with a foot 16 thereon for attachment to a fishing rod (not shown).

As is conventional for this sort of reel, a spool 18 is provided at the front of the reel 10 that holds a supply of fishing line. To effect wrapping of the line around the spool 18 during recall of the line, a rotor 20 is provided. The rotor 20 has diametrically opposed bail ears 22, 24 which rotate about a longitudinal, fore and aft axis 26 of the reel 10, i.e., an axis generally parallel to the central shaft 72. This rotation is imparted by turning a conventional external crank handle 28 through a mechanism to be described in detail below.

The bail ears 22, 24 cooperatively define a support for a pivotable bail assembly 29 consisting of spaced bail arms 30, 32 and a formed wire bail 34 connecting therebetween. As the rotor 20 is operated, a line guide 36 on the bail assembly 29 engages the line and wraps the line around the hub 38 of the spool 18. Because the line guide 36 preferably has a fixed axial position with respect to the reel as it is operating, it is necessary to reciprocate/oscillate the spool 18 about the fore and aft reel axis 26 to cause an even distribution of line on the spool 18 during retrieval. This reciprocation/oscillation occurs cyclically, with a spool stroke between the position of FIG. 1, representing the forwardmost spool position, and the position of FIG. 2, representing the rearwardmost spool position.

Broadly speaking, there are two sorts of spinning reels that would be appropriate for use with the instant invention. The first is a slider-type reciprocating/oscillating mechanism of FIGS. 1 and 2. The second sort of spinning reel is one that utilizes a lever arm to produce the reciprocating/oscillating motion of the spool. An example of this sort of reel may be found in U.S. Pat. No. 5,143,318, cited previously.

Preferred Embodiments

The instant invention is directed to a structure for asymmetrically reciprocating/oscillating the spool 18 during retrieval of fishing line, with the details of a preferred embodiment of that structure being shown in FIGS. 3 to 7. Operationally, and as is well known to those of ordinary skill in the art, within a typical fishing reel 10 rotation of the rotor 20 is effected by turning the reel crank handle 28, the rotational force of which is preferably communicated by way of a crank shaft 62 to a face gear 66 inside of the reel body, which engages a pinion gear 56 which fixedly surrounds a hollow tubular shaft, 50 so that rotation of the face gear 66 causes rotation of the tubular shaft 50. In the preferred embodiment, the tubular shaft 50 is journalled for rotation at its forward end (the end nearest the spool 38) by a plurality of bearings (not shown). The tubular shaft 50 at the end nearest the front of the reel 10 is fixedly connected to the hub of the rotor 20, so that rotation of the tubular shaft 50 is thereby communicated to the rotor 20.

At the same time that the rotor 20 is operated by the crank handle 28, the spool 18 is caused to reciprocate in the line of the longitudinal reel axis 26. This reciprocating/oscillating movement of the spool 18 is permitted by mounting the spool 18 on a reciprocating/oscillating center shaft 72, which is coaxial with the tubular shaft 50 and is closely received within a bore extending axially therethrough for guided movement in the fore and aft directions.

Fore and aft axial shifting of the center shaft 72 is accomplished through the oscillating oscillation/drive gear 88 in combination with guide 42. As can be more clearly seen in FIG. 3, the guide 42 roughly takes the form of an elongate rectangle in which a slot 96 has been incised. Obviously, the external dimensions of the guide 42 are unimportant for purposes of the instant invention, and its overall shape may be modified to suit the space requirements within a particular reel 10. It must be at least large enough to encompass the chosen guide slot 96, though.

A pin 94 on the drive gear 88 engages the slot 96 and travels through that slot 96 as the drive gear 88 rotates. The guide 42 is preferably affixed to (or engaged with) center shaft 72 and the rotational movement drive of gear 88 moves the pin 94 through the guide slot 96 and causes a corresponding fore and aft movement of the guide 42 which, in turn, is communicated to the center shaft 72 and on, ultimately, to the line spool 18.

According to a first preferred embodiment of the instant invention and as is illustrated in FIG. 7, the guide structure 42 preferably takes the form of a "slider" as that term is known to those skilled in the art. Sliders are so-called because they "slide" forward and backward along the reel axis 26 in response to rotation of the drive gear 88, thereby driving oscillatory longitudinal motion of the rotor 20. Incised within the slider 42 on the side facing the drive gear 88 is a preferably blind asymmetric slot 96 which is engaged with pin 94 on the face of the drive gear 88 so that rotation of the drive gear 88 is communicated to the guide structure 42 and on ultimately to the spool 38.

As can be seen more clearly in FIG. 7, the guide slot 96 of the preferred embodiment consists of two distinct regimes—a substantially straight upper terminus 200 and a curved lower terminus 220—separated by an optional transition region 210, where the terms "upper" and "lower" are used for purposes of specificity only, as the shapes of the two termini are obviously completely interchangeable. As is described later, it is critical for purposes of the instant invention that the upper terminus 200 and lower terminus 220 be differently shaped, with the preferred shapes having been selected so as yield velocity profiles that are complimentary with each other. Said another way, the guide slot 96 consist of two asymmetric halves, where its asymmetry is measured with respect to its center line 280. It is preferable that the guide slot 96 be oriented so as to be substantially transverse to the direction of motion of the center shaft 72, i.e., its center line 285 should be at least approximately perpendicular to the longitudinal axis of the reel 10. That being said, the instant inventor has specifically contemplated that guide slot 96 might be mounted at other angles with respect to the longitudinal axis. This sort of arrangement is well known to those of ordinary skill in the art.

The transition region 210 is defined to be a central region of the guide slot 96 and is generally located between the positions of the pin 94 when the spool 38 reverses its movement direction. This may be seen most clearly by comparing FIGS. 1 and 2. In FIG. 1, the spool 38 is pictured as being proximate to its most extended position. The position of the pin 94 when the spool 38 is in this position broadly defines the uppermost extent of the transition region 200 of the guide slot 96. In FIG. 2, the spool 38 is pictured as being at nearly its most rearwardly retracted position and the pin 94 location in this figure broadly represents the lowermost extent of the transition region 210. The function of the transition region 210 is to smoothly link the two different shapes of the slot termini 200 and 220. That being said, it should be clear to one of ordinary skill in the art that transition region 210 is an integral part of the guide slot 96 and has only been introduced for convenience in describing the asymmetries of the termini of the slot 96. Further, although transition region 200 is shown as being roughly linear, that is only a preferred shape and it might be made to be curved or otherwise formed to suit the needs of a given reel.

As is illustrated in FIGS. 8, 9, and 10, the shape of the guide slot 96 at its termini largely controls the pattern of line distribution in the center of the spool 38. FIG. 8 contains a series of "snapshots" showing the position of the guide slot 96/pin 94 combination at different points during in the rotation of the drive gear 88. More particularly, points A through F of FIG. 8 are separated by equal rotation angles of about 30° while the pin 94 is within the lower terminus 220 of the guide slot 96. If the guide slot 96 corrected perfectly for the circular motion of the drive gear 88, fishing line would be laid into spool 38 at equally spaced intervals. However, the corresponding line lay locations (A though F of FIG. 10, corresponding to slot 96 positions A through F of FIG. 8) are not equally spaced—compare the B-C and D-E separations of FIG. 10. However, note that on the reverse pass of the line guide 36, i.e., during the time that the pin 94 is within the upper terminus 200 of the slot 96 (FIG. 9, L though G) the line also is laid at unequally spaced intervals, but the intervals G to L tend to alternate with the lay locations of the other terminus 220, A to F. Note, for example, that lay positions B and C of FIG. 10 tend to "fill in" between the larger gap K to J (similarly with D, I, H, and E). The net effect is to fill the spool 38 more evenly than the pattern of either terminus—operating in duplicate—would tend to do.

Finally, it should be noted that the instant inventor has specifically contemplated that the asymmetric guide slot of the instant invention could be used in any type of fishing reel that utilizes a guide slot. For example, in another preferred embodiment, there is provided a guide and guide slot for a fishing reel substantially similar to that discussed previously, only wherein the guide slot is positioned on a lever arm, rather than on a slider. An example of this general sort of configuration, albeit with a symmetric guide slot, may be found in U.S. Pat. No. 5,143,318, cited previously and incorporated herein by reference. It should be clear to one of ordinary skill in the art how the guide slot of the instant invention could be fashioned to operate on the lever of the cited patent.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A fishing reel, comprising:

(a) a housing;

(b) a line carrying spool, (c) a rotor mounted for rotation relative to said housing and for directing the line onto said spool;

(d) a rotatable crank handle for operating said rotor;

(e) a shaft within said housing,
said shaft defining a longitudinal axis of said housing,
said shaft being reciprocatively movable in a fore and aft direction relative
to said housing along said longitudinal axis, and,
said shaft communicating reciprocating motion to said spool when said shaft is moved reciprocatively;

(f) a drive gear, said drive being urged by said crank handle into rotational motion when said crank handle is rotated;

(g) a protrusion formed on a periphery of said drive gear; and, (h) a guide engaged with said shaft remotely from said spool,
said guide containing an asymmetric guide slot therein,
said guide slot being engaged with said protrusion for converting said rotation of said crank handle into reciprocation of said shaft and spool along said longitudinal axis, and,
said guide slot having an upper terminus and a lower terminus, said upper terminus being substantially linear and said lower terminus being curved, said upper terminus and said lower terminus each being operable to impart a different particular velocity profile to said spool reciprocating motion.

2. A fishing reel according to claim 1, wherein said guide is a slider.

3. A fishing reel according to claim 1, wherein said guide slot is oriented so as to be substantially transverse to said longitudinal axis.

4. A fishing reel according to claim 1, wherein said guide slot is a blind slot.

5. A fishing reel according to claim 1, wherein said guide is fixedly mounted on said shaft.

6. In a fishing reel, of the type having a housing, a rotatable crank handle, a rotor mounted for rotation relative to said housing and being driven into rotation when said crank handle is rotated, a drive gear being urged into rotation by rotation of said crank handle, a protrusion formed on a periphery of said drive gear, a shaft within said housing, said shaft being reciprocatively movable in a fore and aft direction relative to said housing, said shaft defining a longitudinal axis of said housing, a line carrying spool being reciprocatively driven by said shaft as said shaft is moved reciprocatively, and, a drive gear, said drive being urged by said crank handle into rotational motion, a reciprocating/oscillating mechanism, comprising (a) a guide positionable to engage said shaft at an end of said shaft remote from said spool,
said guide containing an asymmetric guide slot positionable to engage with said protrusion for converting said rotation of said crank handle into reciprocation of said shaft in a longitudinal path and,
said guide slot having an upper terminus and a lower terminus, said upper terminus being substantially linear and said lower terminus being curved, said upper terminus and said lower terminus each being operable to impart a different velocity profile to said spool reciprocating motion.

7. A reciprocating/oscillating mechanism according to claim 6, wherein said guide is a slider.

8. A reciprocating/oscillating mechanism according to claim 6, wherein said asymmetric guide slot is oriented so as to be substantially transverse to said longitudinal axis.

9. A reciprocating/oscillating mechanism according to claim 6, wherein said guide slot is a blind slot.

10. A reciprocating/oscillating mechanism according to claim 6, wherein said guide is fixedly mounted on said shaft.

* * * * *